(12) United States Patent
Kim et al.

(10) Patent No.: US 9,875,736 B2
(45) Date of Patent: Jan. 23, 2018

(54) PRE-TRAINING AND/OR TRANSFER LEARNING FOR SEQUENCE TAGGERS

(71) Applicant: Microsoft Technology Licensing, LLC, Redmond, WA (US)

(72) Inventors: Young-Bum Kim, Fairview, WA (US); Minwoo Jeong, Sammamish, WA (US); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 243 days.

(21) Appl. No.: 14/625,828

(22) Filed: Feb. 19, 2015

(65) Prior Publication Data

US 2016/0247501 A1 Aug. 25, 2016

(51) Int. Cl.
| | |
|---|---|
| G10L 15/06 | (2013.01) |
| G06F 17/27 | (2006.01) |
| G06F 17/30 | (2006.01) |
| G06N 99/00 | (2010.01) |
| G10L 15/18 | (2013.01) |
| G06N 7/00 | (2006.01) |

(52) U.S. Cl.
CPC ........ G10L 15/063 (2013.01); G06F 17/2775 (2013.01); G06F 17/30705 (2013.01); G06N 7/005 (2013.01); G06N 99/005 (2013.01); G10L 15/18 (2013.01); G10L 2015/0631 (2013.01)

(58) Field of Classification Search
CPC ............ G06N 5/04; G06N 7/005; G06N 5/02; G06N 99/005; G10L 15/063; G10L 15/0631; G10L 15/18; G06F 17/2775; G06F 17/30705

USPC .......................................................... 706/12
See application file for complete search history.

(56) References Cited

U.S. PATENT DOCUMENTS

| | | | |
|---|---|---|---|
| 7,627,473 | B2 | 12/2009 | Gunawardana et al. |
| 8,473,430 | B2 | 6/2013 | Yu et al. |
| 8,527,432 | B1 | 9/2013 | Guo et al. |
| 2008/0201279 | A1 | 8/2008 | Kar et al. |
| 2012/0072215 | A1* | 3/2012 | Yu ........................ G06K 9/6296 704/240 |
| 2014/0212854 | A1* | 7/2014 | Divakaran ............. G09B 25/00 434/236 |

OTHER PUBLICATIONS

PCT International Search Report in PCT/US2016/016248, dated May 30, 2016, 16 pages.
Ronan Collobert et al., "A unified architecture for natural language processing: deep neural networks with multitasking learning", Paper accepted at the 25th International Conference on Machine Learning, May 2, 2008, # pages.

(Continued)

*Primary Examiner* — Dave Misir

(57) ABSTRACT

Systems and methods for pre-training a sequence tagger with unlabeled data, such as a hidden layered conditional random field model are provided. Additionally, systems and methods for transfer learning are provided. Accordingly, the systems and methods build more accurate, more reliable, and/or more efficient sequence taggers than previously utilized sequence taggers that are not pre-trained with unlabeled data and/or that are not capable of transfer learning/training.

16 Claims, 10 Drawing Sheets

(56) References Cited

OTHER PUBLICATIONS

Joseph Turian et al., "Word representations: A simply and general method for semi-supervised learning" Proceedings of the 48th Annual Meeting of the Association for Computational Linguistics, Jul. 11, 2010, # pages.

Antoine Vinel et al., "Joint Optimization of Hidden Conditional Random Fields and Non Linear Feature Extraction" 13th International Conference on Document Analysis and Recognition, Sep. 18, 2011, # pages.

Karl Stratos et al., "New Transfer Learning Techniques for Disparate Label Sets" Proceedings of the 53rd Annual Meeting of the Association for Computational Linguistics and the 7th International Joint Conference on Natural Language Processing, Jul. 26, 2015, # pages.

Young-Bim Kim et al., "Pre-training of Hidden-Unit CRFs", Proceedings of the 53rd Annual Meeting of the Association for Computational Linguistics and the 7th International Joint Conference on Natural Language Processing, Jul. 25, 2015, # pages.

Laurens Van Der Maaten et al., "Hidden-Unit Conditional Random Fields", Proceedings of the 30th International Conference on Machine Learning, Jun. 14, 2011, # pages.

Daniel L. Silver et al., "Unsupervised and Transfer Learning Workshop", JMLR: Workshop and Conference Proceedings of the Workshop on Unsupervised and Transfer Learning, Jun. 27, 2012, # pages.

Qi, et al., "Semi-Supervised Sequence Labeling with Self-Learned Features", In Proceedings of Ninth IEEE International Conference on Data Mining, Dec. 6, 2009, pp. 428-437.

Kuksa, et al., "Semi-Supervised Bio-Named Entity Recognition with Word-Codebook Learning", In Proceedings of SIAM International Conference on Data Mining, Apr. 29, 2010, 12 Pages.

Lee, Dong-Hyun, "Pseudo-Label : The Simple and Efficient Semi-Supervised Learning Method for Deep Neural Networks", In Proceedings of 30th International Conference on Machine Learning, Jun. 18, 2013, 6 Pages.

Yu, et al., "Sequential Labeling Using Deep-Structured Conditional Random Fields", In IEEE Journal of Selected Topics in Signal Processing, vol. 4, No. 6, Dec. 6, 2010, pp. 965-973.

Celikyilmaz, et al., "Semi-Supervised Semantic Tagging of Conversational Understanding using Markov Topic Regression", In Proceedings of 51st Annual Meeting of the Association for Computational Linguistics, Aug. 4, 2013, pp. 914-923.

Suzuki, et al., "Semi-Supervised Sequential Labeling and Segmentation using Giga-Word Scale Unlabeled Data", In Proceedings of Association for Computational Linguistics with Human Language Technology Conference, Jun. 2008, 9 Pages.

Sarikaya, et al., "Application of Deep Belief Networks for Natural Language Understanding", In Proceedings of IEEE Transactions on Audio, Speech and Languague Processing, Feb. 2014, pp. 1-7.

Yu, et al., "Roles of Pre-Training and Fine-Tuning in Context-Dependent DBN-HMMs for Real-World Speech Recognition", In Proceedings of Neural Information Processing Systems Workshop on Deep Learning and Unsupervised Feature Learning, Dec. 2010, 8 Pages.

Lin, et al., "The CMU Submission for the Shared Task on Language Identification in Code-Switched Data", In Proceedings of First Workshop on Computational Approaches to Code Switching, Oct. 25, 2014, pp. 80-86.

Lewis, et al., "Improved CCG Parsing with Semi-supervised Supertagging", In Journal of Transactions of the Association of Computational Linguistics, vol. 2, Issue 1, Oct. 2014, 12 Pages.

"Second Written Opinion Issued in PCT Application No. PCT/US2016/016248", dated Feb. 7, 2017, 8 Pages.

"International Preliminary Report on Patentability Issued in PCT Application No. PCT/US2016/016248", dated May 23, 2017, 9 Pages.

* cited by examiner

PRE-TRAINING AND/OR TRANSFER LEARNING FOR SEQUENCE TAGGERS

BACKGROUND

Sequential labeling and classification of data (also referred to as sequence tagging herein) has many applications, including those in natural language processing and speech processing. Some example applications include search query tagging, advertisement segmentation, and language identification/verification. Several different machine learning techniques have been applied to sequence tagging problems, such as conditional random fields (CRFs) and neural networks.

Conditional random fields (CRFs) are discriminative models that directly estimate the probabilities of a state sequence conditioned on a whole observation sequence and are also known as information extraction tasks. For example, frames of audio signal data may be converted to features, with the state sequence predicted on all the frames. Because CRFs can be utilized for numerous different tasks and because they can achieve high accuracy with minimal tuning, conditional random fields are the most widely used machine learning technique applied to sequence tagging problems. However, CRFs fail to take advantage of unlabeled data.

It is with respect to these and other general considerations that embodiments disclosed herein have been made. Also, although relatively specific problems may be discussed, it should be understood that the embodiments should not be limited to solving the specific problems identified in the background or elsewhere in this disclosure.

SUMMARY

In summary, the disclosure generally relates to systems and methods for pre-training a sequence tagger, such as hidden layered conditional random field model. More specifically, the systems and methods disclosed herein pre-train hidden layered conditional random field models using unlabeled data. Further, the systems and methods disclosed herein provide for transfer learning (also referred to herein as multitask learning, multitask training, transfer training, or domain adaptation). Additionally, the systems and methods disclosed herein provide a technique for transferring a lower layer of a hidden layer from one task specific model to another task specific model. Accordingly, the systems and methods disclosed herein build more accurate, more reliable, and more efficient sequence taggers.

One aspect of the disclosure is directed to a method for sequence tagging utilizing a machine learning technique. The method includes pre-training a first hidden layered conditional random field (HCRF) model, transferring a first lower layer of the first HCRF to a second HCRF model, and training the second HCRF model for a first specific task. The pre-training includes obtaining unlabeled data, running a word clustering algorithm on the unlabeled data to form word clusters, and determining pseudo-labels for the unlabeled data based on the word clusters to form pseudo-labeled data. The pre-training further includes extracting pre-training features from the pseudo-labeled data and estimating pre-training model parameters for the pre-training features utilizing a training algorithm. The training the second HCRF model for the first specific task includes receiving the first lower layer from the first HCRF model and obtaining a first set of labeled data from a first source for the first specific task. The training further includes estimating first task specific model parameters based on a second training algorithm that is initialized utilizing the task-shared features.

Another aspect of the disclosure includes a sequence tagging system that provides for transfer learning. The sequence tagging system comprises a computing device including a processing unit and a memory. The processing unit implements a first hidden layered conditional random field (HCRF) model. The first HCRF model includes a pre-training system and a first training system. The pre-training system is operable to obtain unlabeled data, run a word clustering algorithm on the unlabeled data to generate word clusters and determine a pseudo-label for each input of the unlabeled data based on the word clusters to form pseudo-labeled data. The pre-training system is further operable to extract pre-training features from the pseudo-labeled data and to estimate pre-training model parameters for the pre-training features utilizing a training algorithm. The pre-training model parameters are stored in a first hidden layer of the first HCRF model. The first training system is operable to obtain a first set of labeled data for a first specific task. The first training system is further operable estimate first task specific model parameters based on a second training algorithm that is initialized utilizing the pre-training model parameters.

Yet another aspect of the disclosure includes a system for pre-training a sequence tagger. The system comprises at least one processor and one or more computer-readable storage media including computer-executable instructions stored thereon. The computer-executable instructions are executed by the at least one processor. The computer-executable instructions cause the system to perform operations including obtaining unlabeled data and running a word clustering algorithm on the unlabeled data to form a plurality of word clusters. The operation further including determining pseudo-labels for the unlabeled data based on the plurality of word clusters to pseudo-labeled data and extracting pre-training features from the pseudo-labeled data. Additionally, the operations including estimating pre-training model parameters for the pre-training features utilizing a training algorithm. The sequence tagger is a hidden layered conditional random field model. The pre-training model parameters are stored within a hidden layer of the hidden layered conditional random field model.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1:
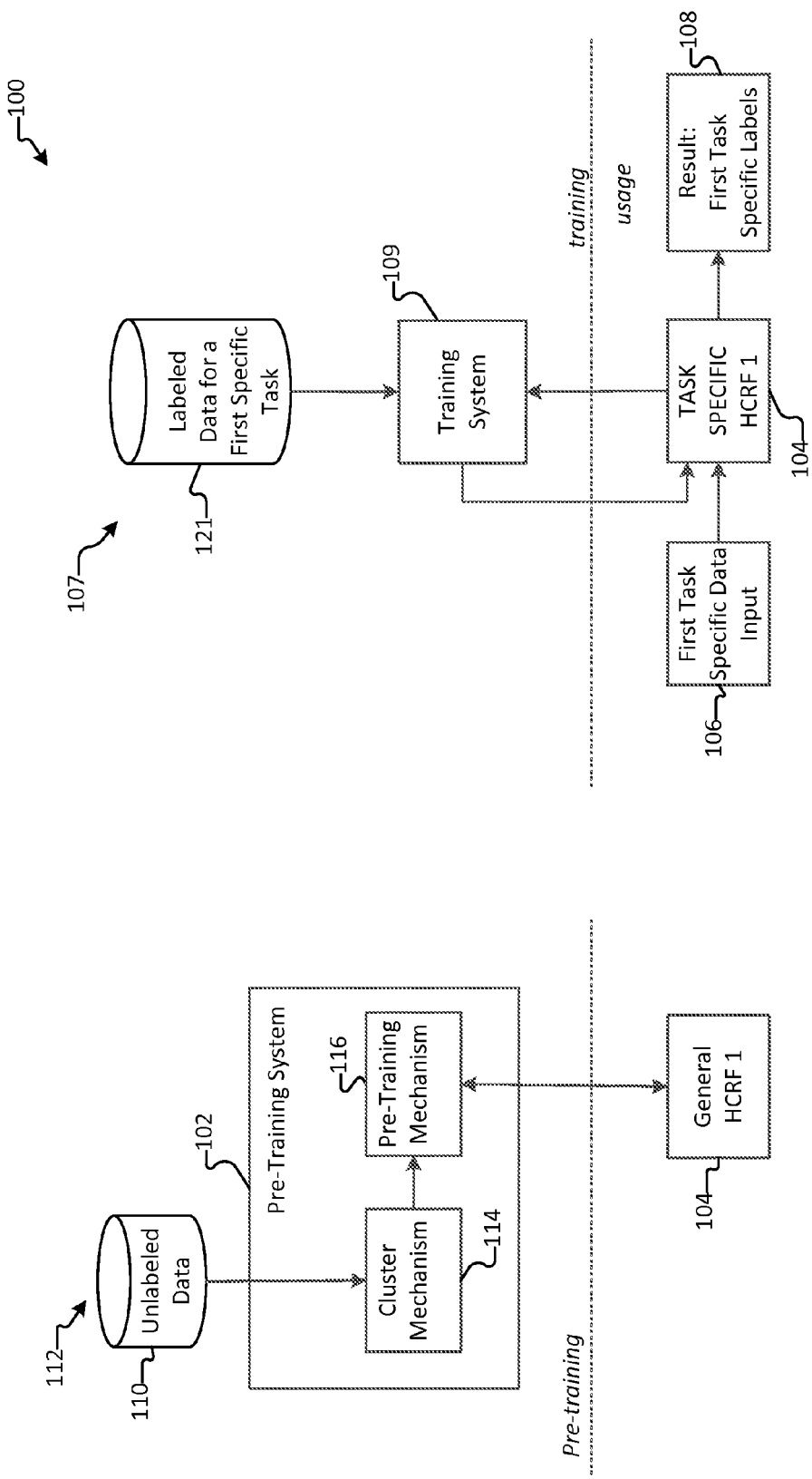
FIG. 1 is a block diagram illustrating an example of a system for pre-training and task specific training a sequence tagger.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Sequence tagging has many applications, including natural language processing and speech processing. Some example applications include search query tagging, advertisement segmentation, and language identification/verification. Several different machine learning techniques have been applied to sequence tagging problems, such as conditional random fields (CRFs) and neural networks.

Conditional random fields (CRFs) are conditional distributions with associated graphical structures. CRFs are a statistical modeling methods used for structured prediction. CRFs, unlike ordinary classifiers, can take the context of an input from the input data into consideration. In other words, CRFs can consider neighboring inputs to any given input. In some CRFs, binary stochastic hidden units appear between the input data and predicted labels. CRFs with hidden units are referred to herein as hidden-layered CRFs or multilayered CRFs. Multilayered CRFs can represent nonlinear dependencies at each frame unlike standard CRFs. Further, the hidden units within the layer of the multilayered CRFs may also learn to discover latent distributed structure in the data that improves classification (or label estimation).

Because CRFs can be utilized for numerous different tasks and because they have high accuracies with minimal tuning, CRFs are the most widely used machine learning technique applied to sequence tagging problems. However, CRFs and other machine learning techniques fail to take advantage of unlabeled data. Further, CRFs and other machine learning techniques cannot effectively learn multiple tasks with the same shared model.

There is typically no system or method for pre-training hidden layered CRFs with unlabeled data for domain adaptation (also referred to herein as transfer learning) by sharing portions of the hidden layer. The systems and method disclosed herein are able to pre-train a multilayered CRF utilizing unlabeled input data. The systems and methods as disclosed herein are also able to allow for transfer learning in multilayered CRFs by sharing a portion of the hidden layer.

The ability of the systems and methods described herein to pre-train a multilayered CRFs utilizing unlabeled data provides a more accurate, a more efficient, and a more reliable sequence tagging system. The ability of the systems and methods described herein to allow for transfer learning and to transfer a portion of the hidden layer from one task specific model to other tasks specific models provides for a more efficient and a more reliable sequence tagging system in comparison with sequence taggers that do utilize any pre-training or transfer learning.

FIG. 1 generally illustrates an example of a system 100 including a pre-training system 102 and training system 109 for a sequence tagger. Sequence taggers are designed to classify (also referred to as labeling or tagging herein) a wide variety of different inputs 106 utilizing machine learning techniques. The inputs 106 may be any sequence of data that needs to be clustered or classified, such as queries, phoneme sequence, genome sequences, and etc. In the illustrated example, the sequence tagger (also referred to as a sequence tagging system herein) is a hidden-layered conditional random field model 104. Other types of sequence taggers include neural networks. Hidden layered conditional random fields (HCRFs) 104, can achieve high accuracy without minimal tuning. The terms "HCRF" and "HCRF model" are equivalent and are utilized interchangeably herein.

Typically, a HCRF 104 receives an input signal 106, extract features from the input signal 106, determines or estimates model parameters for the features, and then outputs a classification 108 or tag 108 for each feature in the form of a probability for each classification state. However, before the HCRF model 104 can classify an input signal 106, the HCRF model 104 has to be trained utilizing task specific training data 107 based on the type of input signal 106 that the HCRF 104 is going to receive.

However, prior to assigning a specific task to the HCRF 104, the HCRF 104 of system 100 is pre-trained with a pre-training system 102 utilizing pre-training data 112 to estimate pre-trained or pre-training model parameters. The pre-training data 112 is unlabeled data 110. The pre-training system 102 obtains the unlabeled data 110. Unlabeled data 110 exists in abundance and is easily obtained. For example, unlabeled data 110 may be obtained from any known database and/or commercial search engine, such as Wikipedia.

The pre-training system 102 includes a cluster mechanism 114 and a pre-training mechanism 116. The cluster mechanism 114 determines a pseudo-label (also referred to as pseudo-tag herein) for each input value of the unlabeled data. The cluster mechanism 114 applies a clustering algorithm to the unlabeled data to generate word clusters. Next, the cluster mechanism 114 determines a pseudo-label for each input value (such as a word) of the unlabeled data based on the word clusters to form pseudo labeled data. In other words, the cluster mechanism 114 clusters observation types in the unlabeled data and treats the clusters as labels or tags.

The pre-training mechanism 116 estimated pre-training model parameters utilizing the pseudo labeled data. The pre-training mechanism 116 extracts features from the pseudo-labeled data. Next, the pre-training mechanism 116 applies a first training algorithm to the features to estimate pre-training parameters (also referred to herein as weighted connections) for each extracted feature.

As discussed above, HCRFs are non-linear models. The HCRF introduces a layer of binary-valued hidden units $z = z_1 \ldots z_n \in \{0, 1\}$ for each pair of label sequence $y = y_1 \ldots y_n$ and observation sequence $x = x_1 \ldots x_n$. The pre-training mechanism 116 parametrized the HCRFs by θ ∈ ℝ$^d$ and γ ∈ ℝ$^{d'}$ defines a joint probability of y and z conditioned on x as follows:

$$p_{\theta,\gamma}(y, z | x) = \frac{\exp(\theta^T \Phi(x, z) + \gamma^T \Psi(z, y))}{\sum_{y' \in y(x,z'), z' \in \{0,1\}^n} \exp(\theta^T \Phi(x, z') + \gamma^T \Psi(z', y'))} \quad \text{EQ. \#1}$$

where,
p is a probability function,
Φ is a global feature function for the lower layer,
θ is a parameter vector for the lower layer,
T is a transpose,
x is the input query,
n is the size of the sequence,
y is a tag,
y' is a possible tag (or is a temporary variable for marginalization),
γ is a parameter vector for the higher layer,
Ψ is a global feature function for the hidden layer,
z is binary random variable (or a binary stochastic hidden unit),
y is above the mapping function, and
y(x) is the set of all possible label sequences for x.
y (x, z) is the set of all possible label sequences for x and z, and for x and z, and Φ(x, z) ∈ ℝ$^d$ and Ψ(z, y) ∈ ℝ$^{d'}$ are global feature functions that decompose into local feature functions:

$$\Phi(x, z) = \sum_{j=1}^{n} \varphi(x, j, z_j) \quad \text{EQ. \#3}$$

$$\Psi(z, y) = \sum_{j=1}^{n} \psi(z_j, y_{j-1}, y_j) \quad \text{EQ. \#4}$$

where,
j is the index of training data and
Φ(x, z) is a global feature function that maps an entire input sequence x and paired with an entire hidden unit sequence z,
Ψ(z, y) is a global feature function that maps an entire input sequence y and paired with an entire hidden unit sequence z,
φ is a local feature function for each time j, and
ψ is a local feature function for each time j.

Figure 3:
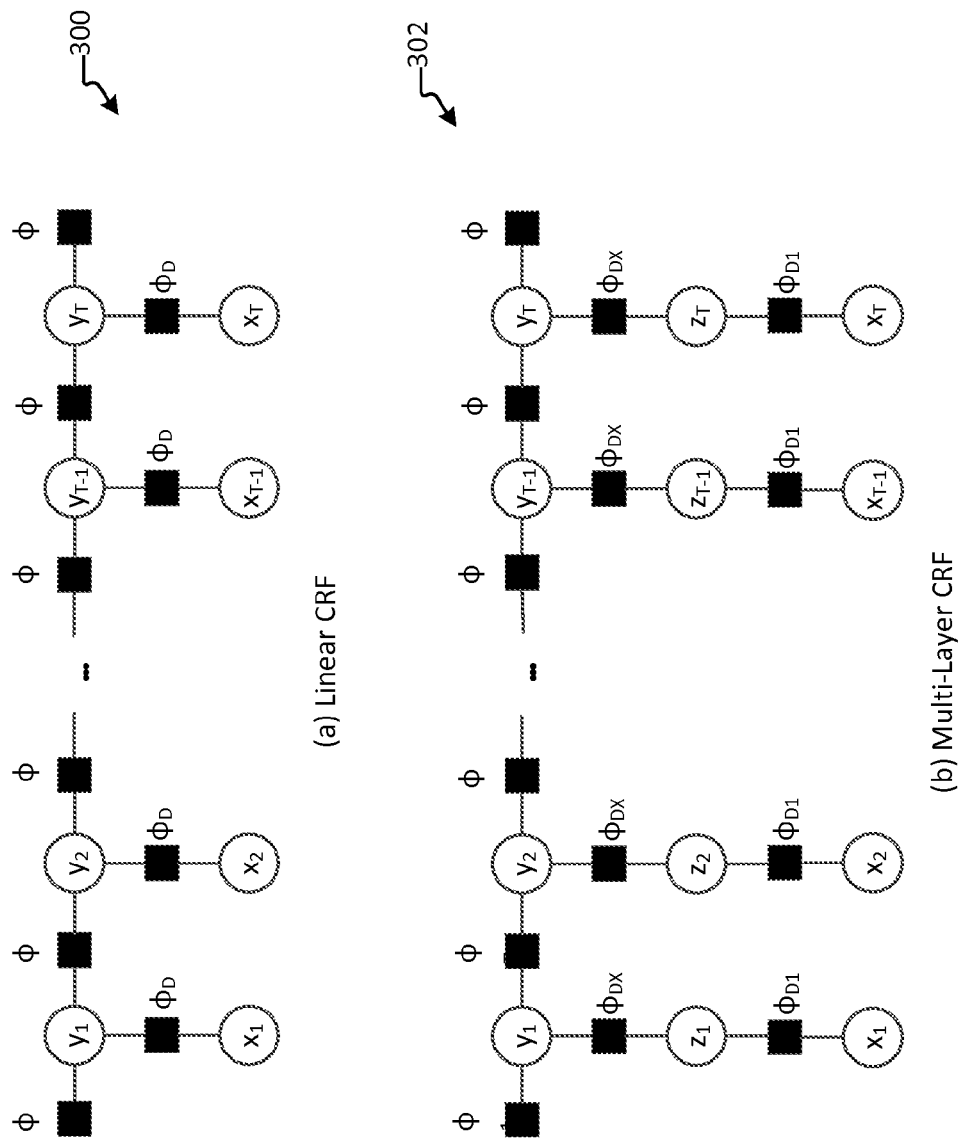
FIG. 3 is a schematic diagram illustrating an example of a linear condition random field and a hidden layered conditional random field.

In other words, HCRFs force the interaction between the observations and the labels at each position j to go through a latent variable $z_j$ as illustrated in FIG. 3. FIG. 3 generally illustrates a schematic example of a linear CRF 300 and a hidden layered CRF 302. The probability of labels y is given by marginalizing over the hidden units, $$p_{\theta,\gamma}(y|x) = \sum_{z \in \{0,1\}^n} p_{\theta,\gamma}(y, z|x) \quad \text{EQ. \#5}$$

As in restricted Boltzmann machines, hidden units are conditionally independent given observations and labels. This allows for efficient inference with HCRFs despite their richness. Accordingly, the pre-training mechanism 116 may utilize Equation #5 as the first training algorithm to estimate the pre-training parameters for each extracted feature. In other words, pre-training mechanism 116 trains a fully supervised HCRF 104 on this clustered data to learn parameters θ for the interaction between observations and hidden units Φ(x, z) and γ for the interaction between hidden units and labels Φ(z, y).

Figure 4:
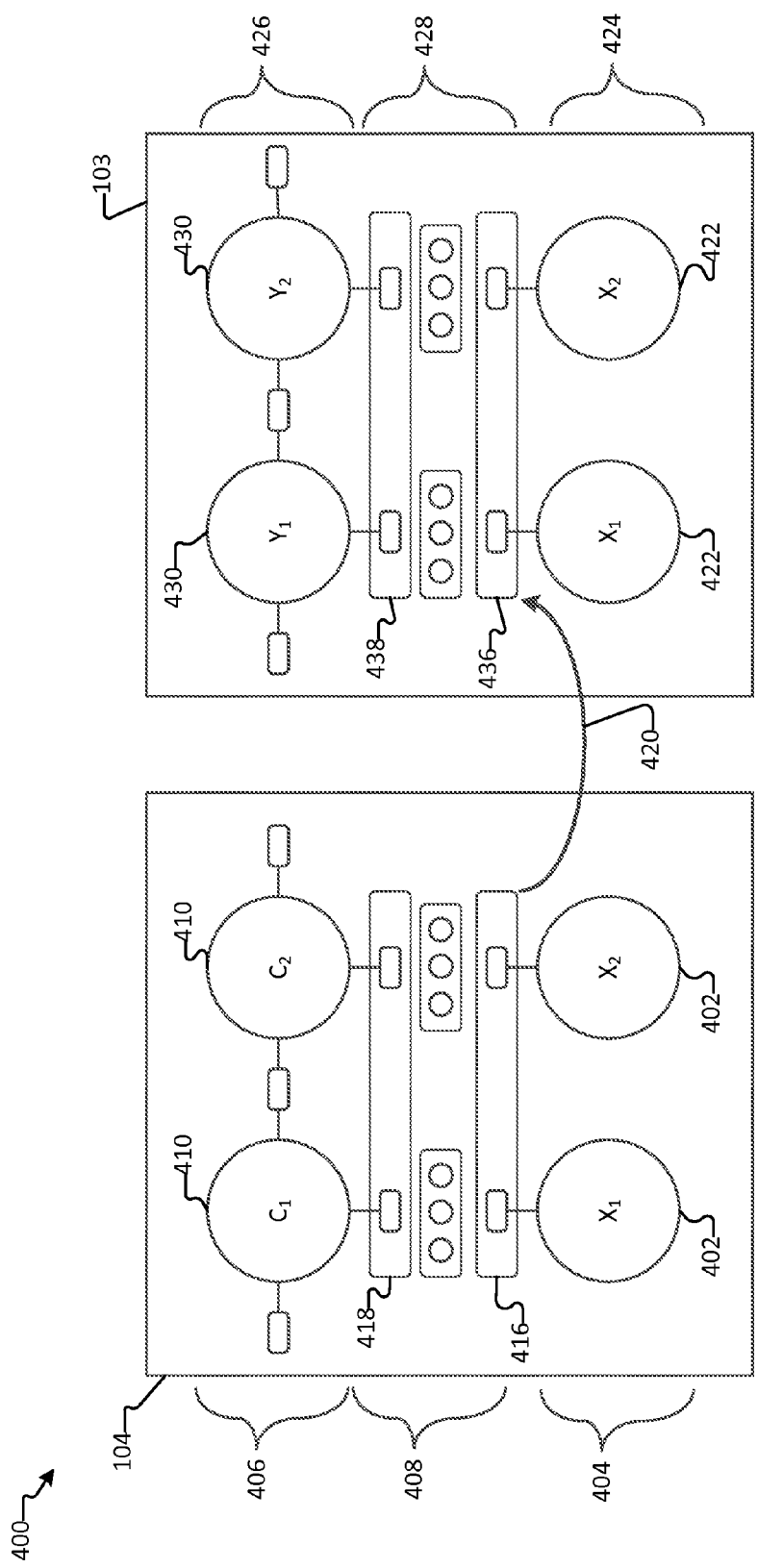
FIG. 4 is a block diagram illustrating an example of a first hidden layered conditional random field model transferring pre-training model parameters to a second hidden layered conditional random field model.

The pre-training parameters are stored in the hidden layer 408 of the HCRF 104 as illustrated in FIG. 4. FIG. 4 generally illustrates an example of a first HCRF model 104 transferring 420 a lower layer 416 to a second HCRF model 103. The hidden layer 408 includes various units, such as the determined connections between an input value 402 from the unlabeled data 110 and the pseudo-label 410, the extracted features, and the estimated pre-training parameters for the features. The HCRF 104 divides the pre-training models parameters into task-shared (or general) and task-specific features. The HCRF 104 stores the task-shared estimated pre-training parameters within the lower layer 416 of the hidden layer 408. The HCRF 104 stores the task-specific estimated pre-training parameters within the upper layer 418 of the hidden layer 408. The HCRF 104 stores the input values 402 from the unlabeled data 110 in an input layer 404. The HCRF 104 stores the pseudo-labels 410 in an output layer 406. The HCRF 104 has now been pre-trained. However, the HCRF 104 still has to be trained for a specific task before use. For example, the HCRF 104 may be trained to be a language understanding model.

Once the HCRF 104 has been pre-trained by the pre-training system 102, the HCRF 104 in system 100 is trained for a specific task. The HCRF 104 is trained for a specific task utilizing a training system 109. The training system 109 may be any known HCRF training system. The specific task will match the type of input data 106 that the HCRF will receive and the type of training data 107 that the HCRF 104 will obtain.

The training system 109 trains the HCRF 104 for a specific task. The training system 109 obtains labeled training data 107. The labeled training data 107 as illustrated in FIG. 1, is labeled training data for a first specific task 121. The specific task may also be referred to as a "specific application" herein. The labeled training data 107 may be obtained by any suitable known system or method for obtaining labeled data for a training system 109. The labeled training data 107 is fully-labeled and/or partially labeled data. However, most training systems 109 utilize fully labeled data.

The training system 109 estimates task specific model parameters utilizing a second training algorithm. The second training algorithm may be any suitable training algorithm for estimating task specific model parameters for a HCRF. However, the second training algorithm is initialized utilizing the estimated pre-training model parameters. In contrast, HCRFs that do not undergo pre-training will initialize the training algorithm at random. If the clusters from the cluster mechanism 114 are non-trivially correlated to the pseudo-labels, the training system 109 can capture the interactions between observations and hidden units in a meaningful way.

After the HCRF 104 is trained for a specific task by the training system 109, the hidden layer 408 of the HCRF 104 may be updated with additional hidden units, such as the determined connections between the task specific input values and the task specific labels, the extracted task specific features, and the estimated task specific model parameters for the task specific features. As illustrated in FIG. 4, the HCRF 104 stores the task specific estimated parameters within an upper layer 418 of the hidden layer 408. Further, after training, the input layer 404 of HCRF 104 is updated to include values 402 from the training data 107 and the task specific query 106 or query input 106. Additionally after training, the output layer 406 is updated to include tags 410 or labels 410 determined from the estimated task specific model parameters.

Figure 2:
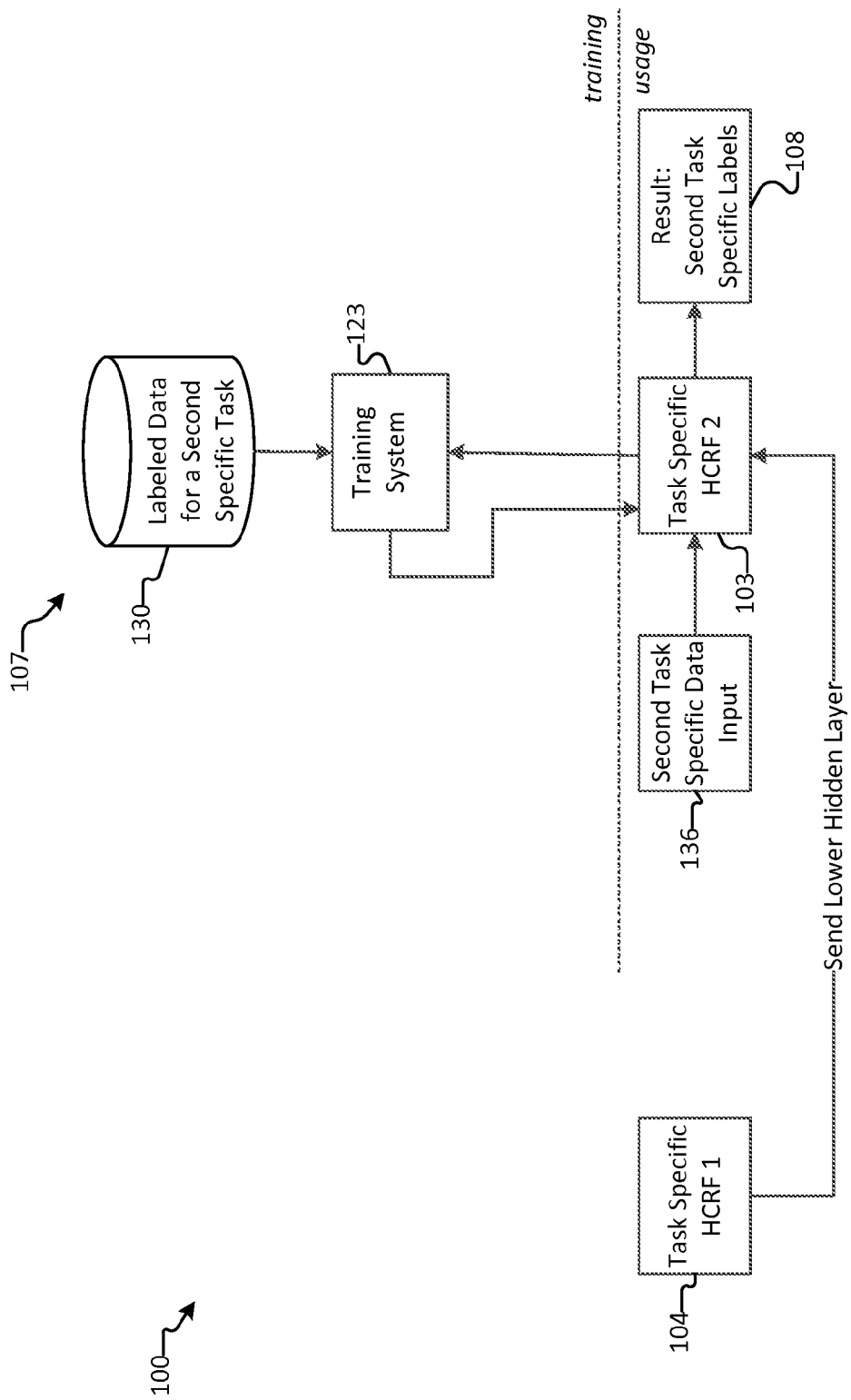
FIG. 2 is a block diagram illustrating an example of a system for transfer learning.

System 100 also allows the lower layer of the hidden layer to be transferred from one task specific model to another task specific model (or from a first HCRF 104 to a second HCRF 103 as illustrated in FIGS. 2 and 4) to allow for multi-task training. FIG. 2 generally illustrates an example of a system 100 for transfer learning. System 100 includes the HCRF 104 discussed above that has been pre-trained and task trained making the HCRF 104 a task specific HCRF 104. The task specific HCRF 104 stores task shared features in a lower layer 416 of its hidden layer 408. The task specific HCRF 104 illustrated in FIG. 2 has been pre-trained. In other embodiments, the HCRF 104 illustrated in FIG. 2 has been pre-trained but has not yet been trained for a specific task. As illustrated in FIGS. 2 and 4, the HCRF 1 transfers 420 the lower layer 416 of the hidden layer 408, which includes task-shared features (also referred to herein as task-shared estimated pre-training parameters), to a second task specific HCRF 103.

The second HCRF 103 receives the lower layer 416 from the HCRF 104. The second HCRF 103, similar to the first HCRF 104, also has an input layer 424, a hidden layer 428, and an output layer 426 as illustrated in FIG. 4. The second HCRF 103 stores the received task-shared features in the lower layer 436 of its hidden layer 428. The second HCRF 103 stores input values from the training data 107 and from the second task specific input data 136 in the input layer 424. The second HCRF 103 stores the determined tags 430 or labels 430 based on the training data 107 or the second task specific input data 136 in the output layer 426. The hidden layer 428 of the second HCRF 103 also includes various units, such as the determined connections between an input value 422 and a task specific label 430, the extracted features, pre-training parameters and task specific model parameters. In some embodiment, the second HCRF 103 stores estimated task specific parameters in an upper layer 438 of its hidden layer 428 and stores the task-shared estimated pre-training parameters in a lower layer 436 of its hidden layer 428 as illustrated in FIG. 4.

The second HCRF 103 is also trained for a specific task. The second HCRF 103 is trained for a specific task utilizing a training system 123. The training system may be trained for a specific task utilizing any suitable training system for an HCRF. In some embodiments, the training system 123 is the same as training system 109. The training system 123 obtains labeled training data 130 for second specific task. Any suitable method for obtaining labeled training data 130 may be utilized by system 100. The second HCRF 103 may be trained in the same or a different task as the HCRF 104. As such, the labeled data 130 may be the same as the labeled data 120 or may be different.

Once the training system 123 has obtained the labeled data 130 for the specific task performed by the second HCRF 103, the training system 109 estimates task specific model parameters utilizing a third training algorithm. The third training algorithm may be any suitable training algorithm for estimating task specific model parameters for a HCRF. However, the third training algorithm is initialized utilizing the task-shared features received from the first HCRF 104. In contrast, HCRFs that do not receive a lower layer will initialize the training algorithm at random. In some embodiments, the first, second, and third training algorithms are all the same. In other embodiments, at least one of the first, second, and third training algorithms are different from each other.

Accordingly, system 100 provides for transfer learning by allowing a lower layer from a first task specific module to be transferred to and utilized by a second task specific module. Further, system 100 transfers task-shared features from a first task specific model to a second task specific model. System 100 further is able to pre-train modules utilizing unlabeled data. As such, system 100 provides for more efficient and more reliable sequence tagging systems in comparison with sequence taggers that do not utilized unlabeled data for pre-training. Further, system 100 provides for more efficient, more accurate, and more reliable sequence tagging systems in comparison with sequence taggers that are not capable of transfer training/learning.

Figure 5:
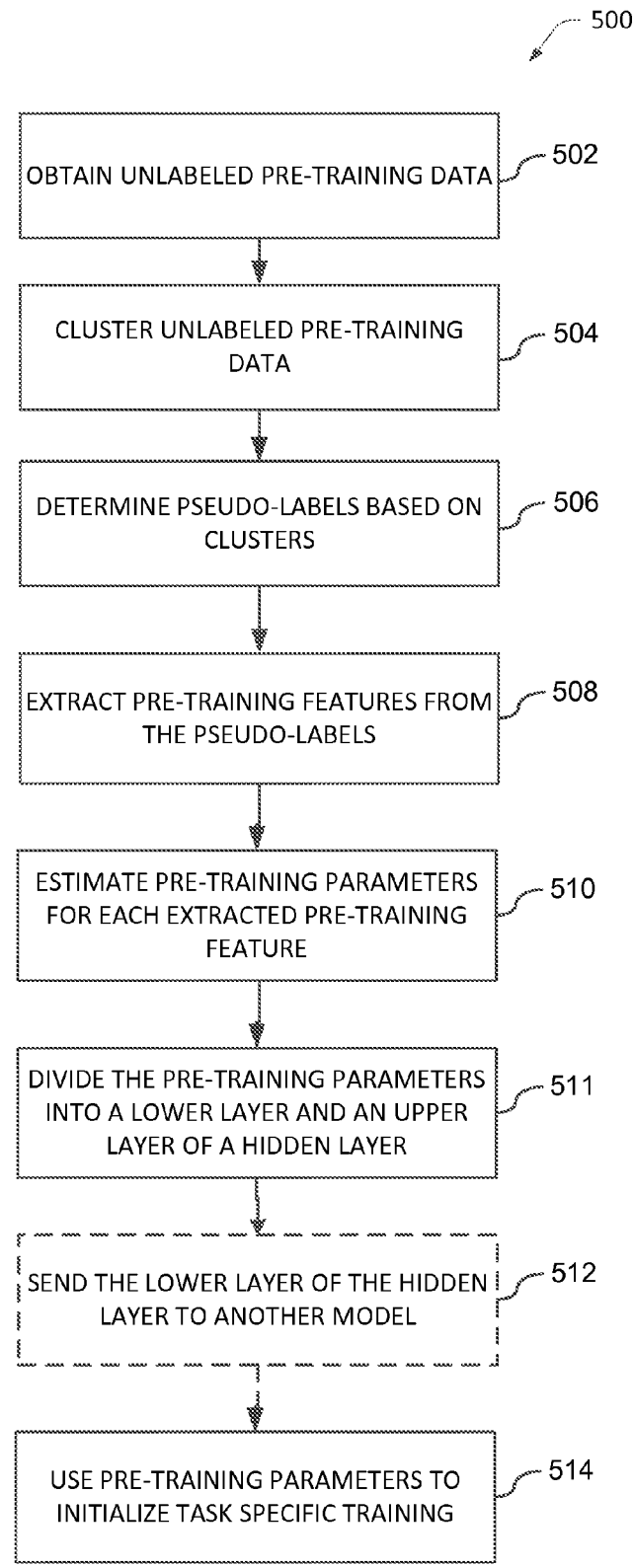
FIG. 5 is a flow diagram illustrating an example of a method for pre-training and training a sequence tagger utilizing unlabeled data.

FIG. 5 is a flow diagram conceptually illustrating an example of a method 500 for pre-training and training a sequence tagger, such as a HCRF, utilizing machine learning techniques. In some embodiments, a portion of method 500 is performed by a pre-training system 102. In some embodiments, a portion of method 500 is performed by a training system 109. Method 500 pre-trains a sequence tagger utilizing unlabeled data. As such, method 500 provides for a more accurate sequence tagging method, a more reliable sequence tagging method, and a more efficient sequence tagging method in comparison with sequence tagging methods that do not undergo any pre-training with unlabeled data.

At operation 502 unlabeled data is obtained. Any suitable method for obtaining unlabeled data may be utilized at operation 502. In some embodiments, the unlabeled data is automatically obtained at operation 502 by exploiting large amounts of unlabeled data from commercial search engines and/or other commercial databases. The obtained unlabeled data may be referred to herein as pre-training data.

At operation 504 a word clustering algorithm is run on the unlabeled data to generate one or more word clusters. Any suitable word clustering algorithm as would be known by a person of skill in the art may be utilized during operation 504. Pseudo-labels are determined for the unlabeled data based on the one or more word clusters and form pseudo-labeled data at operation 506. At operation 508 pre-training features are extracted from the pseudo-labeled data. In some embodiments, the features include attributes and/or descriptions for each input value of the pseudo-labels.

Next, at operation 510 pre-training parameters for each of the extracted pre-training features are estimated utilizing a pre-training algorithm. In some embodiments, the pre-training algorithm utilized at operation 510 is Equation #5. In other words, pre-training parameters $\theta$ for the interaction between observations and hidden units $\Phi(x, z)$ and y for the interaction between hidden units and labels $\Phi(z, y)$ are determined at operation 510.

The pre-training parameters are divided into a lower layer and an upper layer of the hidden layer at operation 511. The lower layer captures and stores task-shared features of the pre-training model parameters at operation 511. The upper layer captures and stores task-specific features of the pre-training parameters at operation 511.

In some embodiments, the task-shared features of the pre-training parameters (or the lower layer) are sent to another or a second HCRF at operation 512. In further embodiments, the second HCRF model is a task specific model that performs the same task as the HCRF that sent the pre-training model parameters. In alternative embodiments, the second HCRF model is a task specific model that performs a different task from the HCRF that sent the pre-training model parameters.

At operation 514 task specific model parameters are estimated for obtained task specific labeled data based on a second training algorithm that is initialized utilizing the estimated pre-training model parameters. As discussed above, the training algorithm may be any suitable training algorithm for a HCRF.

Figure 6:
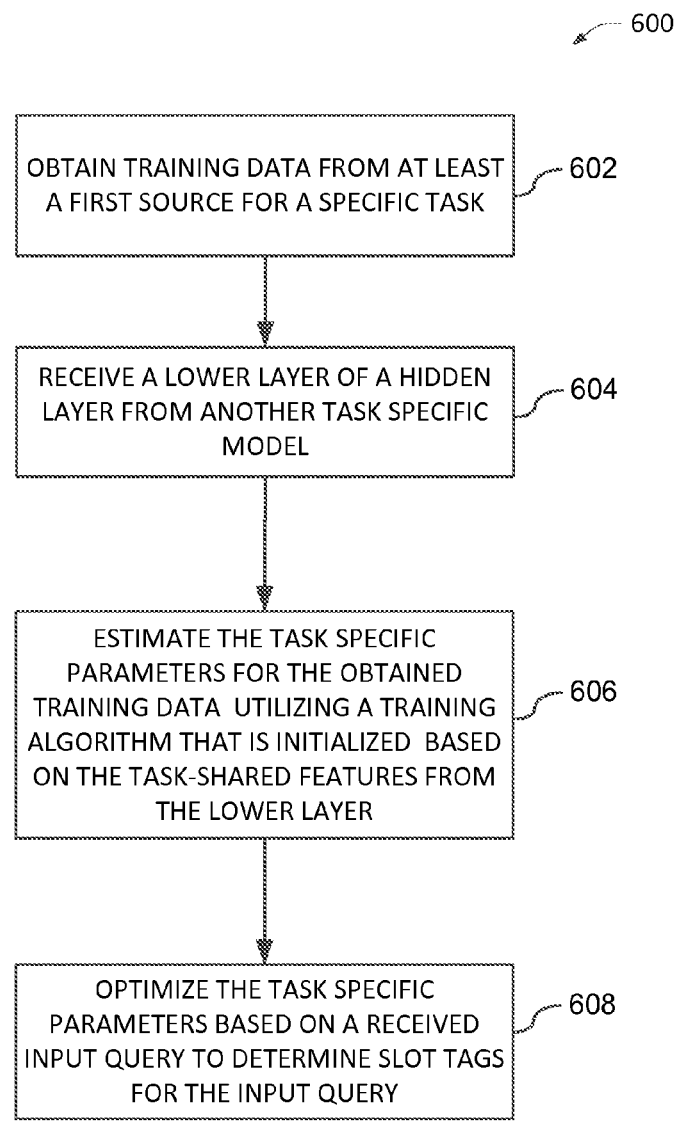
FIG. 6 is a flow diagram illustrating an example of a method for training a sequence tagger for a specific task.

FIG. 6 is a flow diagram conceptually illustrating an example of a method 600 for task specific training of a sequence tagger, such as a HCRF, utilizing machine learning techniques. In some embodiments, method 600 is performed by a training system 123. Method 600 trains a sequence tagger utilizing task-shared features from another task specific model. As such, method 600 provides for a more accurate, a more reliable, and/or a more efficient sequence tagging method in comparison with sequence tagging methods that do not utilize task-shared features. Additionally, method 600 provides for a more accurate, a more reliable, and/or a more efficient sequence tagging methods in comparison with sequence tagging methods that do not utilize any multi-task training.

At operation 602, training data for a specific task from at least a first source is obtained. Any suitable method for obtaining fully-labeled and/or partially labeled data for a specific task may be utilized at operation 602. Often, fully-labeled training data will be obtained by operation 602. However, in some embodiments, partially labeled data for a specific task is obtained at operation 602.

Once the training data from at least one source for a specific task has been obtained by operation 602, operation 604 is performed. At operation 604 a lower layer of a hidden layer from another task specific model is received. The lower layer includes task-shared features from estimated model parameters determine by the other task specific model.

At operation 606 task specific parameters are estimated for the obtained labeled data utilizing a third training algorithm that is initialized with the received task-shared features.

Once a sequence tagger, such as a HCRF, has been trained by method 600, the HCRF can be applied to various tagging tasks. For example, the HCRF may receive a query input, such as a language query. At operation 608 slot tags for the received input query are determined by optimizing the task specific parameters based on the received input query. In other words, once the HCRF has been trained, the HCRF utilizes the training system to optimize the task specific model parameters for each feature of the received query. The HCRF determines a tag (also referred to as label or classification) for each feature based on the optimized task specific parameters. The determined tags are output by the HCRF as the result.

In some embodiments, a sequence tagging system is disclosed. This sequence tagging system includes means for pre-training a first hidden layered conditional random field (HCRF) model. The means for pre-training includes means for obtaining unlabeled data, means for running a word clustering algorithm on the unlabeled data to form word clusters, and means for determining pseudo-labels for the unlabeled data based on the word clusters to form pseudo-labeled data. The means for pre-training further includes means for extracting pre-training features from the pseudo-labeled data and estimating pre-training model parameters for the pre-training features utilizing a first training algorithm. In some embodiments, the sequence tagging system further includes means for transferring a lower layer of a hidden layer of the first HCRF model to a second HCRF model. The lower layer includes task-shared features. In additional embodiments, the sequence tagging system further includes means for training the second HCRF model for a first specific task. The means for training includes means for receiving the lower layer from the first HCRF model and means for obtaining labeled data the first specific task. The means for training further includes means for estimating first task specific model parameters based on a training second training algorithm that is initialized utilizing the task-shared features. In some embodiments, the sequence tagging system also includes means for training the first HCRF model for a second specific task. The means for training the first HCRF model for a second specific task includes means for obtaining a second set of labeled data for the second specific task. The means for training the first HCRF model for a second specific task also includes means for estimating second task specific parameters based on the third training algorithm that is initialized utilizing the task-shared features.

In some embodiments, a method for sequence tagging utilizing a machine learning technique. The method includes pre-training a first hidden layered conditional random field (HCRF) model, transferring a first lower layer of a first hidden layer of the first HCRF to a second HCRF model, and training the second HCRF model for a first specific task. The pre-training includes obtaining unlabeled data, running a word clustering algorithm on the unlabeled data to form word clusters, and determining pseudo-labels for the unlabeled data based on the word clusters to form pseudo-labeled data. The pre-training further includes extracting pre-training features from the pseudo-labeled data and estimating pre-training model parameters for the pre-training features utilizing a training algorithm. The training the second HCRF model for the first specific task includes receiving the first lower layer from the first HCRF model and obtaining a first set of labeled data from a first source for the first specific task. The training further includes estimating first task specific model parameters based on a second training algorithm that is initialized utilizing the task-shared features. The method builds more efficient, more reliable, and more accurate sequence taggers in comparison to methods that do not undergo pre-training and that are not capable of transfer learning. The method may build a language understanding model. The method may further include training the first HCRF model for a second specific task, obtaining a second set of partially labeled data for the second specific task, and estimating second task specific parameters based on the second training algorithm that is initialized utilizing the pre-training model parameters.

In other embodiments, a sequence tagging system that provides for transfer learning. The sequence tagging system comprises a computing device including a processing unit and a memory. The processing unit implements a first hidden layered conditional random field (HCRF) model. The first HCRF model includes a pre-training system and a first training system The pre-training system is operable to obtain unlabeled data, run a word clustering algorithm on the unlabeled data to generate word clusters and determine a pseudo-label for each input of the unlabeled data based on the word clusters to form pseudo-labeled data. The pre-training system is further operable to extract pre-training features from the pseudo-labeled data and to estimate pre-training model parameters for the pre-training features utilizing a training algorithm. The pre-training model parameters are stored in a first hidden layer of the first HCRF model. The first training system is operable to obtain a first set of labeled data for a first specific task. The first training system is further operable estimate first task specific model parameters based on a second training algorithm that is initialized utilizing the pre-training model parameters. The first training system may be further operable to receive a task specific query and to optimize the first task specific model parameters based on the task specific query to determine task specific labels for the task specific query. The first HCRF model may be further operable to send a first lower layer of the first hidden layer of the first HCRF model to a second HCRF model. The processing unit may further implement the second HCRF model. The second HCRF model may comprises a second training system. The second training system may obtain a second set of labeled data for a second specific task and may estimate second task specific model parameters based on the second training algorithm that is initialized utilizing task-shared pre-training model parameters from the received first lower layer. Further, the second HCRF model includes a second hidden layer. The second hidden layer includes a second upper layer and a second lower layer. The task-shared pre-training model parameters may be stored in the second lower layer. The second task specific model parameters may be stored in the second upper layer. The first specific task may be different than the second specific task. The first specific task may be a first application and the second specific task may be a second application. The first application and/or the second application may be a digital assistant application; a voice recognition application; an email application; a social networking application; a collaboration application; an enterprise management application; a messaging application; a word processing application; a spreadsheet application; a database application; a presentation application; a contacts application; a gaming application; an e-commerce application; an e-business application; a transactional application; and exchange application; or a calendaring application. The first HCRF model and the second HCRF model may be implemented on a mobile telephone, a smart phone, a tablet, a smart watch, a wearable computer, a personal computer, a desktop computer, a gaming system, and a laptop computer. The sequence tagging system is more accurate, more reliable, and more efficient in comparison with other sequence tagging systems that are not cable of transfer learning. The first hidden layer of the first HCRF model may further include a first upper layer and a first lower layer. Task-shared pre-training model parameters may be stored in the first lower layer. The first task specific model parameters and task specific pre-training model parameters may be stored in the first upper layer. In further embodiments, a system for pre-training a sequence tagger. The system comprises at least one processor and one or more computer-readable storage media including computer-executable instructions stored thereon. The computer-executable instructions are executed by the at least one processor. The computer-executable instructions cause the system to perform operations including obtaining unlabeled data and running a word clustering algorithm on the unlabeled data to form a plurality of word clusters. The operation further including determining pseudo-labels for the unlabeled data based on the plurality of word clusters to pseudo-labeled data and extracting pre-training features from the pseudo-labeled data. Additionally, the operations including estimating pre-training model parameters for the pre-training features utilizing a training algorithm. The sequence tagger is a hidden layered conditional random field model. The pre-training model parameters are stored within a hidden layer of the hidden layered conditional random field model.

Figure 7:
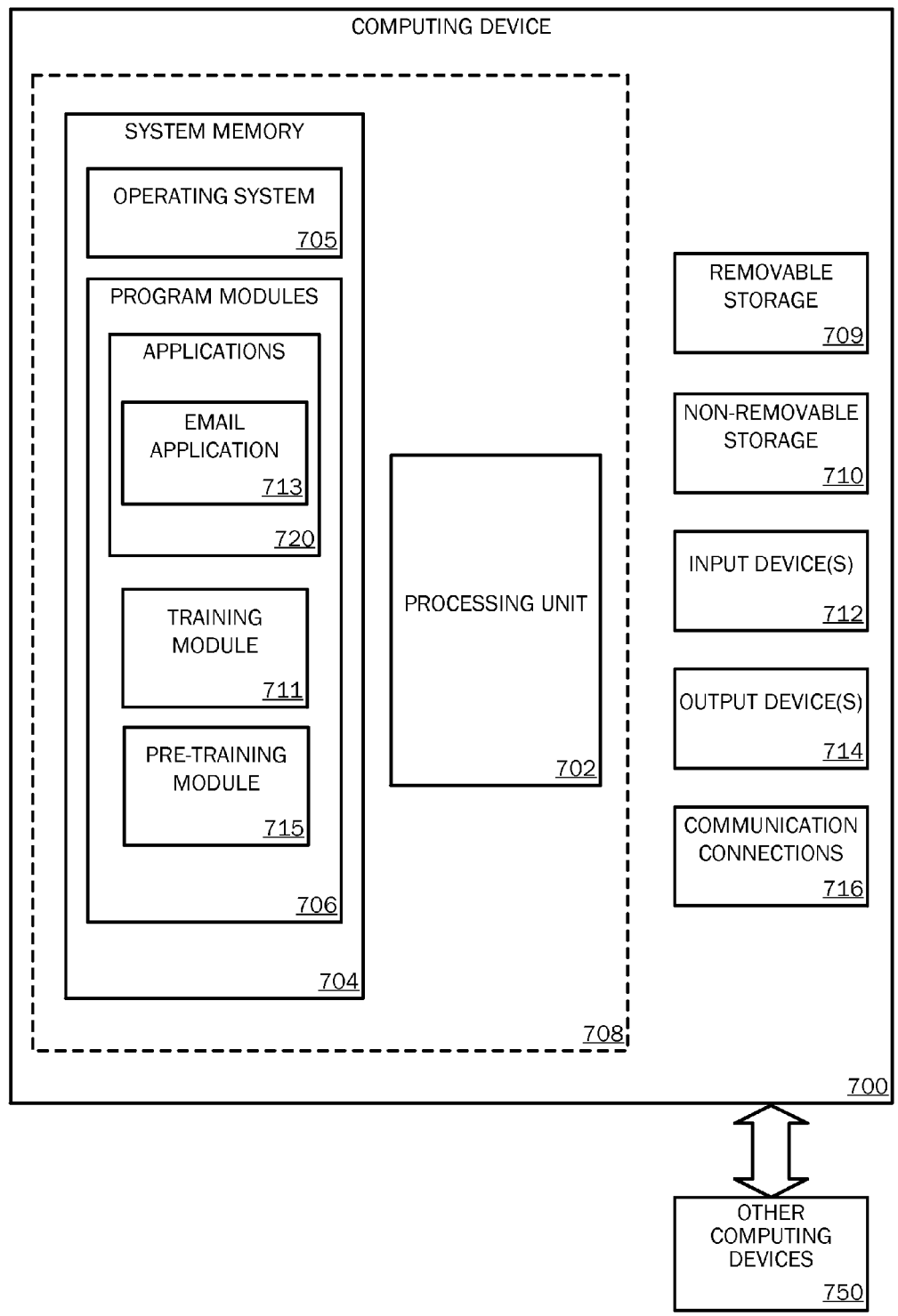
FIG. 7 is a block diagram illustrating example physical components of a computing device with which embodiments of the disclosure may be practiced.
Figure 8A:
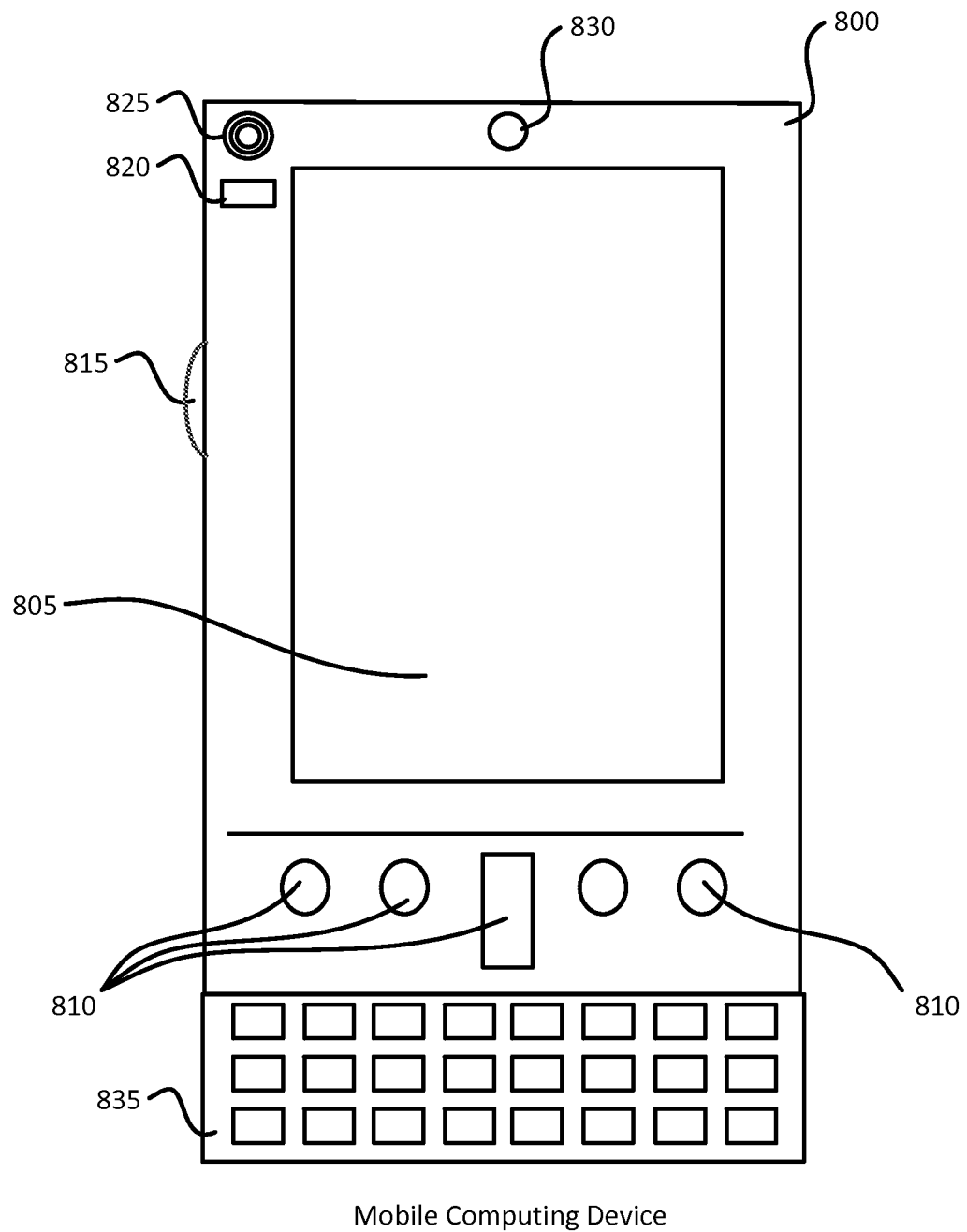
FIGS. 8A and 8B are simplified block diagrams of a mobile computing device with which embodiments of the present disclosure may be practiced.
Figure 8B:
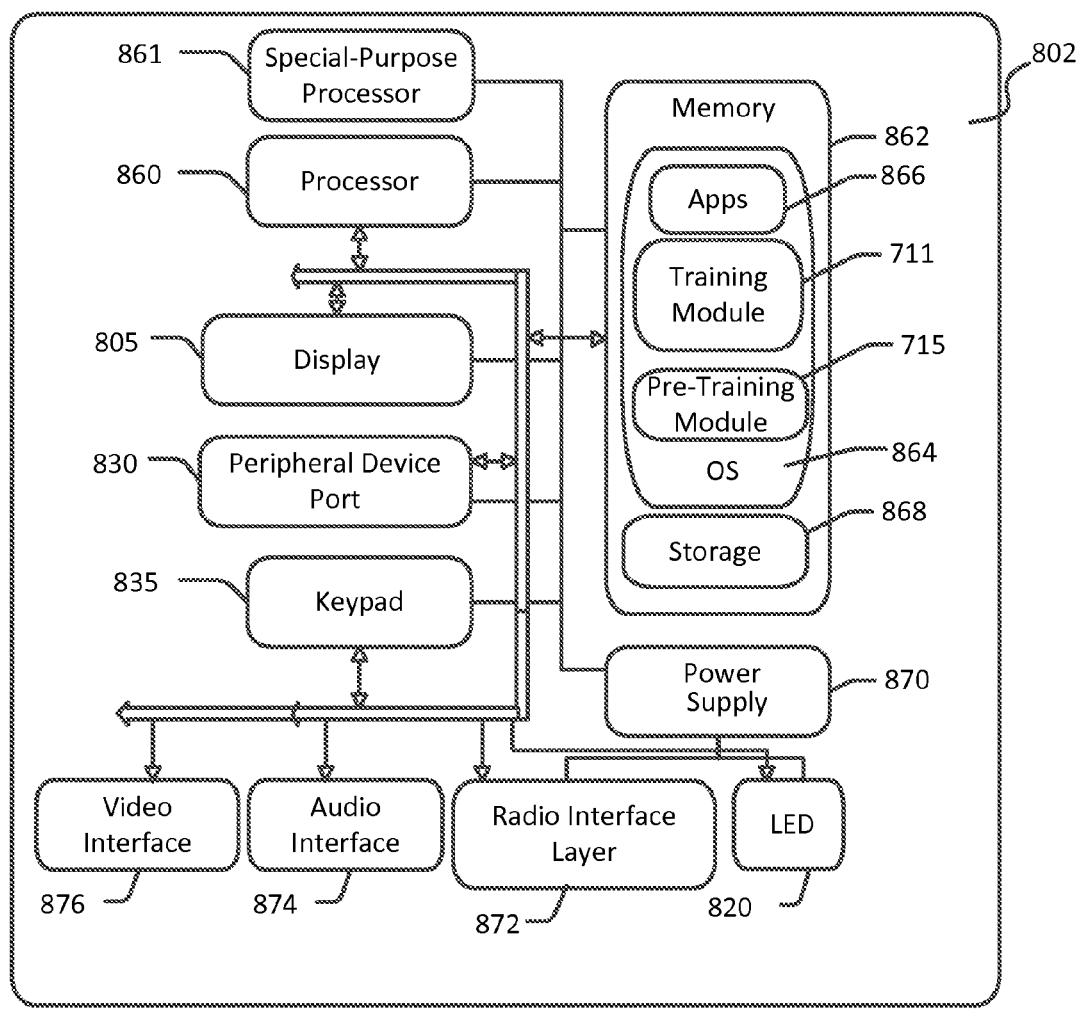
Figure 9:
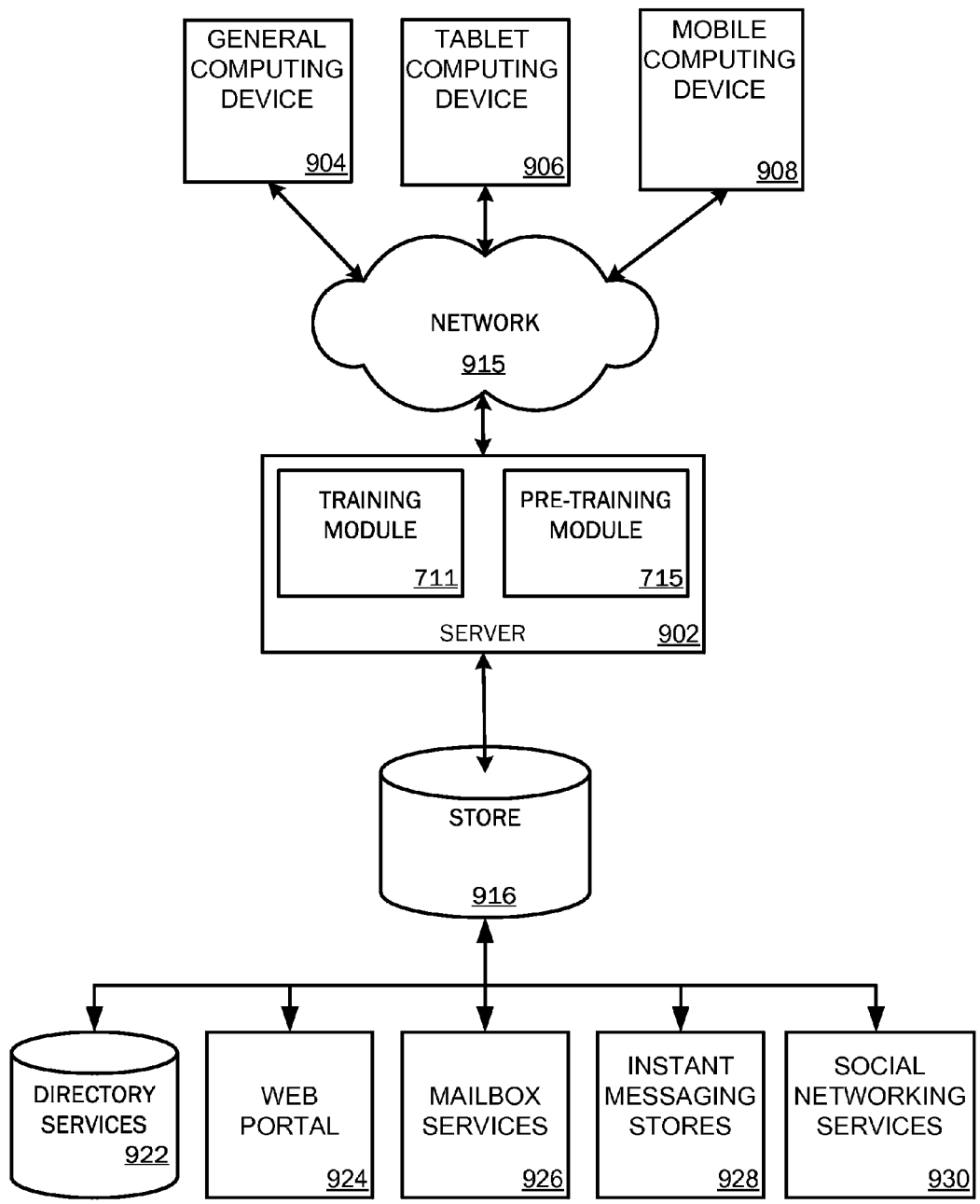
FIG. 9 is a simplified block diagram of a distributed computing system in which embodiments of the present disclosure may be practiced.

FIGS. 7-9 and the associated descriptions provide a discussion of a variety of operating environments in which embodiments of the disclosure may be practiced. However, the devices and systems illustrated and discussed with respect to FIGS. 7-9 are for purposes of example and illustration and are not limiting of a vast number of computing device configurations that may be utilized for practicing embodiments of the disclosure, described herein.

FIG. 7 is a block diagram illustrating physical components (e.g., hardware) of a computing device 700 with which embodiments of the disclosure may be practiced. For example, the training system or module 711 and/or the pre-training system or module 715 could be implemented by the computing device 700. In some embodiments, the computing device 700 is one of a mobile telephone, a smart phone, a tablet, a smart watch, a wearable computer, a personal computer, a desktop computer, a gaming system, a laptop computer, and etc. The computing device components described below may include computer executable instructions for a training module 711 and/or pre-training module 715 that can be executed to employ the methods 500 and/or 600 and implement portions of the system 100 disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 1006 suitable for running software applications 720. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710. For example, partially labeled data and/or unlabeled data obtained by the training module 711 and/or pre-training module 715 could be stored on any of the illustrated storage devices. In other examples, pre-training model parameters and/or task specific model parameters determined by the training module 711 and/or pre-training module 715 could be stored on any of the illustrated storage devices.

As stated above, a number of program modules and data files may be stored in the system memory 704. While executing on the processing unit 702, the program modules 706 (e.g., training module 711, pre-training module 715 or email application 713) may perform processes including, but not limited to, performing method 500, and/or 600 as described herein. For example, the processing unit 702 may implement a training module 711 and/or pre-training module 715. Other program modules that may be used in accordance with embodiments of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a calendaring application, etc. In some embodiment, the training module 711 gathers partially labeled and/or unlabeled crowdsourced data specific for one of the above referenced applications.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, RF transmitter, receiver, and/or transceiver circuitry; universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, wearable computer (such as a smart watch), a tablet personal computer, a laptop computer, and the like, with which embodiments of the disclosure may be practiced. With reference to FIG. 8A, one embodiment of a mobile computing device 800 suitable for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display).

If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display.

In addition to, or in place of a touch screen input device associated with the display 805 and/or the keypad 835, a Natural User Interface (NUI) may be incorporated in the mobile computing device 800. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various embodiments, the output elements include the display 805 for showing a graphical user interface (GUI). In embodiments disclosed herein, the various user information collections could be displayed on the display 805. Further output elements may include a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (e.g., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 866, training module 108 and/or pre-training module 715 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for processing data received at a computing system from a remote source, such as a general computing device 904, tablet 906, or mobile device 908, as described above. Content displayed at server device 902 may be stored in different communication channels or other storage types. For example, various documents may be stored using a directory service 922, a web portal 924, a mailbox service 926, an instant messaging store 928, or a social networking site 930. By way of example, the training module 711 and/or the pre-training module 715 may be implemented in a general computing device 904, a tablet computing device 906 and/or a mobile computing device 908 (e.g., a smart phone). Partially labeled task specific data, unlabeled crowd-sourced data, unlabeled search log data, and/or partially labeled search log data, may be obtained by the server device 902, which may be configured to implement the training module 711 and/or pre-training module 715, via the network 915. In some implementations, partially labeled or unlabeled data is periodically transmitted to the server device 902 and are stored in the store 916. In further implementations, pre-trained model parameters and/or task specific model parameters are periodically transmitted to the server device 902 and are stored in the store 916.

EXAMPLE 1

An experiment was conducted to compare a traditional CRF, a HCRF, and a pre-trained HCRF (PHCRF) to each other. The traditional CRF does not have a hidden layer, so the traditional CRF directly maps input features to task-specific labels in a linear function. The HCRF encodes for 300 hidden units that represent shared representation of features. However, the HCRF has not undergone any pre-training. The PHCRF has been pre-trained with unlabeled data based on the systems and methods disclosed herein. All three CRFs were built to create language understanding models. Each of the CRFs was trained utilizing fully-labeled crowd-sourced data for a specific application. The three different CRFs were applied to various query domains utilizing Cortana®. Hundreds of tagging tasks were performed relating to each of these domains that include alarm, calendar, communication, note, ondevice, places, reminder, and weather. Every query in each domain was performed by each CRF. Table 1 below shows the properties of the datasets used in this experiment. The accuracy of the CRFs' results were monitored and recorded as illustrated in Table 2 below. The accuracy score provided in Table 2 below is defined as the harmonic mean of precision and recall (F1). An accuracy score of 100 is the best score possible, while a score of 0 is the worst score possible.

TABLE 1

Data statistics for Cortana ®

| Domain | Train (# of Queries) | Test (# of Queries) | Log (unlabeled) (# of Queries) |
|---|---|---|---|
| Alarm | 27865 | 3334 | 132002 |
| Calendar | 50255 | 7017 | 62153 |
| Communication | 104881 | 14486 | 594073 |
| Note | 17445 | 2342 | 28395 |
| Ondevice | 60847 | 9704 | 105469 |
| Places | 150349 | 20798 | 410122 |
| Reminder | 6266 | 8235 | 517412 |
| Weather | 53096 | 9114 | 220439 |

For all domains other than alarm, using non-linear CRF improved performance to 90.75% from 90.12% on average. Simply using HCRF with initialization from pre-training boosts the performance up to 91.08%, corresponding to a 10% decrease in error relative to an original CRF. More particularly, the weather and reminder domains had a relative error reduction of 23% and 16%, respectively.

TABLE 2

F1 performance comparison between HCRF and HCRF+

| Domain | CRF (%) | HCRF (%) | PHCRF (%) |
|---|---|---|---|
| Alarm | 91.79 | 91.79 | 91.96 |
| Calendar | 87.60 | 87.65 | 88.21 |
| Communication | 91.84 | 92.49 | 92.80 |
| Note | 87.72 | 88.48 | 88.72 |
| Ondevice | 89.37 | 90.14 | 90.64 |
| Places | 88.02 | 88.64 | 88.99 |
| Reminder | 87.72 | 89.21 | 89.72 |
| Weather | 96.93 | 97.38 | 97.63 |
| Average | 90.12 | 90.75 | 91.08 |

Accordingly, Table 2 illustrates that the HCRF was more accurate and more reliable at returning proper results in every domain than the traditional CRF. Table 2 further illustrates that the PHCRF was more accurate and more reliable at returning proper results in every domain but alarm than the traditional CRF and the HCRF. Accordingly, the pre-training systems and method disclosed herein build a more accurate and a more reliable model when compared to traditional HCRFs.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary embodiments were provided so that this disclosure was thorough and complete and fully conveyed the scope of the other possible embodiments to those skilled in the art. For example, aspects of the various embodiments disclosed herein may be modified and/or combined without departing from the scope of this disclosure.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

The invention claimed is:

1. A sequence tagging system that provides for transfer learning, the sequence tagging system comprising:
 a computing device including a processing unit and a memory, the processing unit implementing a first hidden layered conditional random field (HCRF) model, the first HCRF model comprises a pre-training system and a first training system, the pre-training system is operable to:
 obtain unlabeled data;
 run a word clustering algorithm on the unlabeled data to generate word clusters;
 determine a pseudo-label for each input of the unlabeled data based on the word clusters to form pseudo-labeled data;
 extract pre-training features from the pseudo-labeled data, and
 estimate pre-training model parameters for the pre-training features utilizing a first training algorithm,
 wherein the pre-training model parameters are stored in a first hidden layer of the first HCRF model,
 wherein the first hidden layer of the first HCRF model further includes a first upper layer and a first lower layer,
 wherein task-shared pre-training model parameters are stored in the first lower layer, and
 wherein first task specific model parameters and task specific pre-training model parameters are stored in the first upper layer;
 the first training system is operable to:
 obtain a first set of labeled data for a first specific task;
 estimate the first task specific model parameters based on a second training algorithm that is initialized utilizing the pre-training model parameters;
 send the first lower layer of the first hidden layer of the first HCRF model to a second HCRF model; and
 applying the second HCRF model to a tagging task to determine a tag and outputting by the second HCRF model the determined tag as a result.

2. The sequence tagging system of claim 1, wherein the first training system is further operable to:
 receive a task specific query; and
 optimize the first task specific model parameters based on the task specific query to determine task specific labels for the task specific query.

3. The sequence tagging system of claim 1, wherein the processing unit further implements the second HCRF model, the second HCRF model comprises a second training system, the second training system is operable to:
 obtain a second set of labeled data for a second specific task;
 estimate second task specific model parameters based on the second training algorithm that is initialized utilizing task-shared pre-training model parameters from the received first lower layer.

4. The sequence tagging system of claim 3, wherein the second HCRF model includes a second hidden layer, wherein the second hidden layer includes a second upper layer and a second lower layer,
    wherein the task-shared pre-training model parameters are stored in the second lower layer, and
    wherein the second task specific model parameters are stored in the second upper layer.

5. The sequence tagging system of claim 3, wherein the first specific task is different than the second specific task;
    wherein the first specific task is a first application and the second specific task is second application, and
    wherein the first application and the second application are one of:
    a digital assistant application;
    a voice recognition application;
    an email application;
    a social networking application;
    a collaboration application;
    an enterprise management application;
    a messaging application;
    a word processing application;
    a spreadsheet application;
    a database application;
    a presentation application;
    a contacts application;
    a gaming application;
    an e-commerce application;
    an e-business application;
    a transactional application;
    and exchange application; and
    a calendaring application.

6. The sequence tagging system of claim 3, wherein the first HCRF model and the second HCRF model are implemented on at least one of:
    a mobile telephone;
    a smart phone;
    a tablet;
    a smart watch;
    a wearable computer;
    a personal computer;
    a desktop computer;
    a gaming system; and
    a laptop computer.

7. The sequence tagging system of claim 1, wherein the first specific task is an application, wherein the application is one of:
    a digital assistant application;
    a voice recognition application;
    an email application;
    a social networking application;
    a collaboration application;
    an enterprise management application;
    a messaging application;
    a word processing application;
    a spreadsheet application;
    a database application;
    a presentation application;
    a contacts application;
    a gaming application;
    an e-commerce application;
    an e-business application;
    a transactional application;
    an exchange application; and
    a calendaring application.

8. The sequence tagging system of claim 1, wherein the first HCRF model is implemented on at least one of:
    a mobile telephone;
    a smart phone;
    a tablet;
    a smart watch;
    a wearable computer;
    a personal computer;
    a desktop computer;
    a gaming system; and
    a laptop computer.

9. The sequence tagging system of claim 1, wherein the second training algorithm is different than the first training algorithm.

10. A method for sequence tagging utilizing a machine learning technique, the method comprising:
    pre-training a first hidden layered conditional random field (HCRF) model, wherein the pre-training comprises:
        obtaining unlabeled data;
        running a word clustering algorithm on the unlabeled data to form word clusters;
        determining pseudo-labels for the unlabeled data based on the word clusters to form pseudo-labeled data;
        extracting pre-training features from the pseudo-labeled data, and
        estimating pre-training model parameters for the pre-training features utilizing a first training algorithm;
        dividing the pre-training model parameters into a first upper layer and a first lower layer of a first hidden layer, wherein the first upper layer captures task-specific features and the first lower layer captures task-shared features;
    transferring the first lower layer to a second HCRF model,
    training the second HCRF model for a first specific task, wherein the training comprises:
        receiving the first lower layer from the first HCRF model;
        obtaining a first set of labeled data for the first specific task;
        estimating first task specific model parameters based on a second training algorithm that is initialized utilizing the pre-training model parameters; and
        applying the second HCRF model to a tagging task to determine a tag and outputting by the second HCRF model the determined tag as a result.

11. The method of claim 10, wherein the method builds a language understanding model.

12. The method of claim 10, wherein the second training algorithm is identical to the first training algorithm.

13. The method of claim 10, wherein the first specific task is an application,
    wherein the application is one of:
        a digital assistant application;
        a voice recognition application;
        an email application;
        a social networking application;
        a collaboration application;
        an enterprise management application;
        a messaging application;
        a word processing application;
        a spreadsheet application;
        a database application;
        a presentation application;
        a contacts application;
        a gaming application;
        an e-commerce application;
        an e-business application;
        a transactional application;

an exchange application; and a calendaring application.

14. The method of claim 10, wherein the first HCRF model and the second HCRF model are implemented on at least one of:
   a mobile telephone;
   a smart phone;
   a tablet;
   a smart watch;
   a wearable computer;
   a personal computer;
   a desktop computer;
   a gaming system; and
   a laptop computer.

15. The method of claim 10, further comprising:
   training the first HCRF model for a second specific task, wherein the training comprises:
      obtaining a second set of partially labeled data for the second specific task; and
      estimating second task specific parameters based on the second training algorithm that is initialized utilizing the pre-training model parameters.

16. A system for pre-training a sequence tagger, the system comprising:
   at least one processor; and
   one or more computer-readable storage media including computer-executable instructions stored thereon that, responsive to execution by the at least one processor, cause the system to perform operations including:
      obtaining unlabeled data;
      running a word clustering algorithm on the unlabeled data to form a plurality of word clusters;
      determining pseudo-labels for the unlabeled data based on the plurality of word clusters to pseudo-labeled data;
      extracting pre-training features from the pseudo-labeled data;
      estimating pre-training model parameters for the pre-training features utilizing a training algorithm,
      wherein the sequence tagger is a first hidden layered conditional random field (HCRF) model, and
      wherein the pre-training model parameters are stored within a hidden layer of the first hidden layered conditional random field model;
      dividing the pre-training model parameters stored within the hidden layer into task-specific features and task-shared features;
      transferring the first hidden layer to a second HCRF model,
   training the second HCRF model for a first specific task, wherein the training comprises:
      receiving the first hidden layer from the first HCRF model;
      obtaining a first set of labeled data for the first specific task; and
      estimating first task specific model parameters based on a second training algorithm that is initialized utilizing the pre-training model parameters; and
      applying the second HCRF model to a tagging task to determine a tag and outputting by the second HCRF model the determined tag as a result.

* * * * *